Dec. 13, 1966　　J. C. KOTELLY ETAL　　3,291,157
INTERNALLY GENERATED AND INTERNALLY COUPLED
TUBING AND PIPE EXTENSIONS
Filed Sept. 4, 1963　　　　　　　　　　　3 Sheets-Sheet 1

INVENTORS
JOHN C. KOTELLY &
ANTHONY SCIOLA
BY Wade Koonty and
Sherman H. Goldman
ATTORNEYS

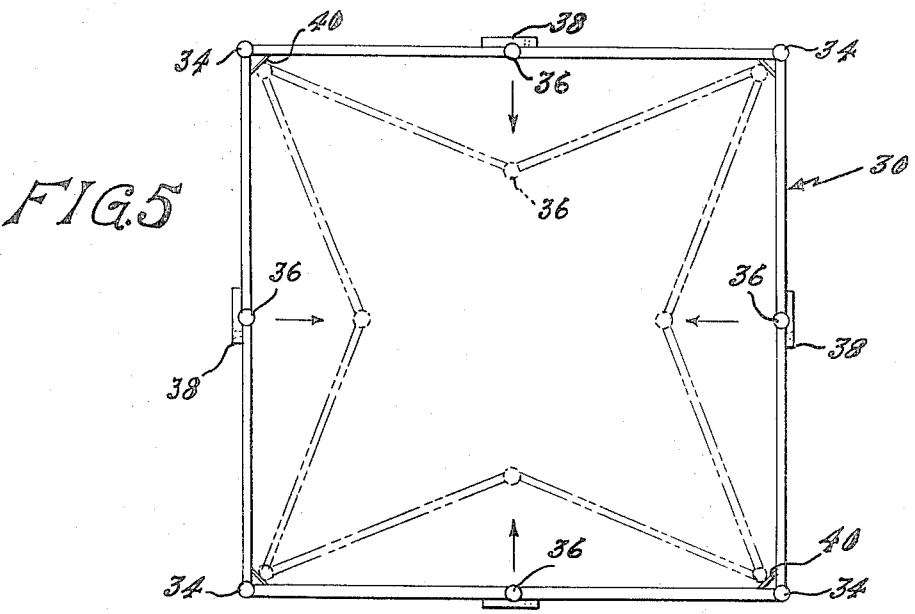
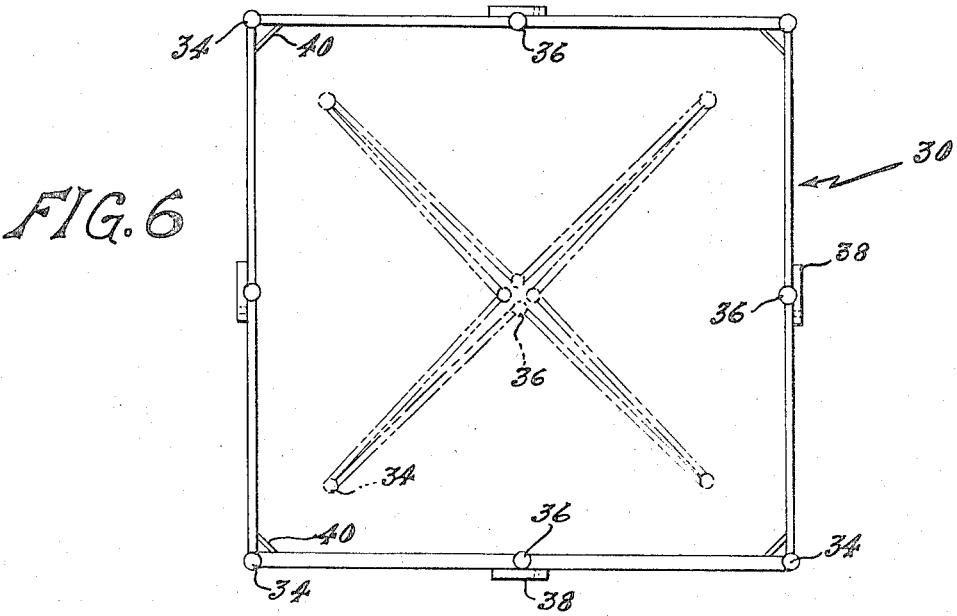

Dec. 13, 1966  J. C. KOTELLY ETAL  3,291,157
INTERNALLY GENERATED AND INTERNALLY COUPLED
TUBING AND PIPE EXTENSIONS
Filed Sept. 4, 1963  3 Sheets-Sheet 3

INVENTORS
JOHN C. KOTELLY &
ANTHONY SCIOLA
BY
ATTORNEYS

United States Patent Office 3,291,157
Patented Dec. 13, 1966

3,291,157
INTERNALLY GENERATED AND INTERNALLY COUPLED TUBING AND PIPE EXTENSIONS
John Christopher Kotelly, 176 Marine Road, South Boston, Mass., and Anthony Sciola, 509 Ferry St., Everett, Mass.
Filed Sept. 4, 1963, Ser. No. 306,641
6 Claims. (Cl. 138—119)

The invention described herein may be manufactured and used by or for the United States Government for governmental purposes without payment to us of any royalty thereon.

This invention relates generally to the coupling of long lengths of pipe or tubing which are joined together by extending the pipe to be added through the first installed section of pipe. This type of assembly is usually deemed expedient when deep shafts are drilled in oil well exploration, mining operations and river tunnel construction. This assembly process also has utility when radioactive materials or areas are required to be probed with tubing while the operators remain remote from the radioactive source.

Previously, a telescoping procedure was utilized in this type of construction where the diameter of each of the successive pipe sections was less than that of the previously installed section. This invention avoids the telescoping procedure by allowing for a deformation of the sections of pipe to be installed such that they may be introduced into the first installed sections and later expanded for joinder therewith upon release of the deformation. This procedure allows for the maintenance of a constant inner and outer diameter throughout the length of the resultant sectional pipe, which in turn allows for a maintenance of flow capacity and strength throughout length of the assembly.

Accordingly, it is an object of this invention to provide a novel method and apparatus for assembling pipe where one end is inaccessible.

It is another object of this invention to provide a method and apparatus for assembling at least a pair of pipes by the insertion of one pipe within the other and expanding the inserted pipe when it is in the proper position in order to key it to the original section pipe.

It is a further object of this invention to provide a pipe that is capable of deformation to a smaller diameter along its length and later is expanded to its original shape or form.

It is a still further object of this invention to provide a resilient pipe formed of laced polygonal frames of metal or lazy tongs that may be expanded, coupled and rigidized.

Another object of this invention involves the provision for a tool for contracting pipe sections.

An additional object of this invention involves the provision of an internally generated and coupled pipe extension which is constructed of conventional, currently available materials that lend themselves to mass production manufacturing techniques.

These and other advantages, features and objects of the invention will become more apparent from the following description taken in connection with the illustrative embodiments in the accompanying drawings, wherein:

FIGURE 5 is an end view of a polygonal form with phantom lines showing the unit in a partly collapsed position;

FIGURE 6 is a view similar to that of FIGURE 5 with the phantom lines indicating the unit in its completely collapsed position;

Figure 1:
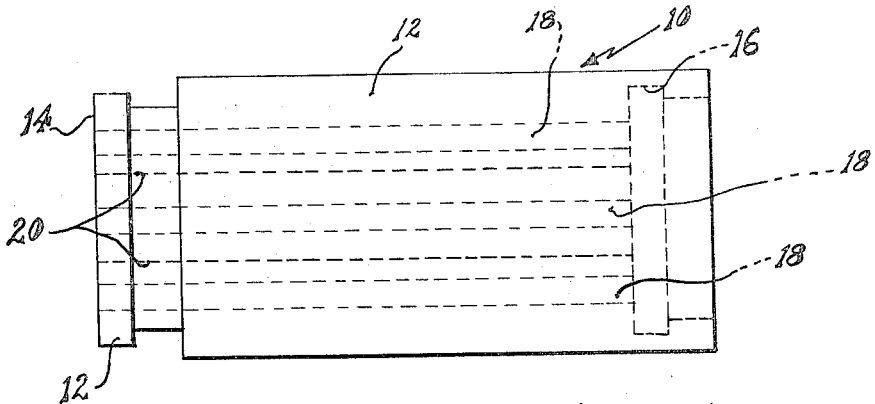
FIGURE 1 is a plan view of a pipe section incorporating the features of this invention.
Figure 2:
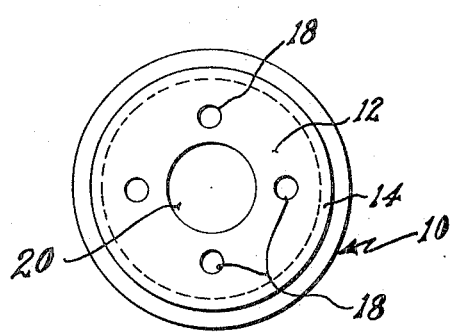
FIGURE 2 is an end view of the embodiment of FIGURE 1.

Referring to FIGURES 1 and 2, there is shown a length of pipe or conduit 10 which is capable of being deformed in order to reduce its outer dimensions for the entire length thereof. The conduit section 10 is formed of a pliable, resilient plastic 12 with a male flange 14 at one end and a female mating groove 16 at the opposite end of the conduit. A series of rigid metallic rods 18 are provided around the central aperture 20 in order to provide the unit with structural reinforcement and also to allow the unit to be collapsed to form a longitudinal fluting or corrugation between adjacent rods. The rods 18 need not extend through the flange 14 but may be encompassed by the plastic material 12.

Since the pipe sections 10 are manufactured to be inserted one through the other, the diametral dimensions must be reduced prior to insertion of a particular section to be coupled. Where the diameter is small, and very resilient plastic for the sections is utilized, the unit might be manually collapsed at the situs and noosed to maintain it at its reduced diameter. Tear wires or other means should be provided to release the nooses once the section is in its proper position. Alternatively, the conduit sections 10 might be noosed at the time of manufacture such that it is delivered to the user ready for immediate installation by release of the nooses.

Figure 3:
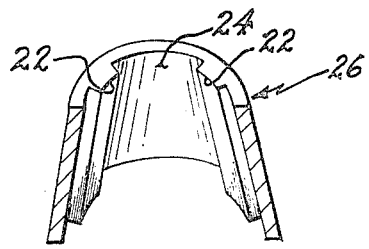
FIGURE 3 is a pictorial view partly in cross-section of a tool for reducing the diameter of the pipe section of FIGURES 1 and 2.

A frustoconical tool 26 having alternate lands 22 and grooves 24, as shown in FIGURE 3, could be utilized to reduce the diameter of the pipe section 10, the lands 22 forming a depression in the plastic to produce the corrugations between adjacent rods 18. It should be understood that the tool also could be made adjustable and portable to provide for the reduction of diameter of variously sized sections at the point of installation. In order to facilitate a manual operation the plastic 12 could be of reduced cross-section between the rods to facilitate the corrugating action.

Once a first section of pipe 10 is placed in position, successive, noosed sections are inserted within the first installed section after having been squeezed to a collapsed condition, either manually or by use of the tool of FIGURE 3. When a flange 14 is in position adjacent a groove 16 in a previously installed section, the unit is allowed to expand by the resilient action of the plastic 12 upon release of the nooses or other clamping means. When an internal pressure is applied through the passageway 20, the flange 14 is forced by the pressure into a tighter sealing relationship with the groove 16. The rods and plastic have maximum strength for the pipe unit under the internal pressure force. This type of assembly allows for a maintenance of a constant internal diameter throughout the length of the pipe or conduit rather than the gradual reduction required for telescoping pipe sections.

Figure 4:
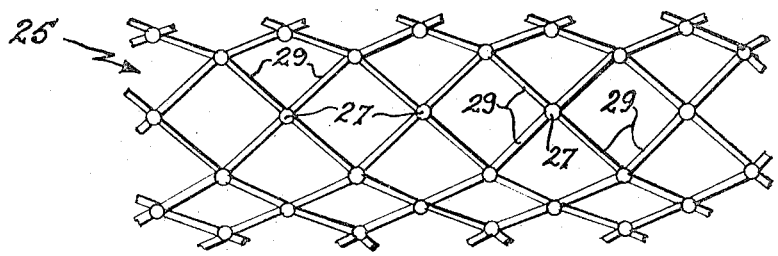
FIGURE 4 is a plan view of a lazy tong type of form which allows for a variation in diameter for constructing a sectional pipe.

An embodiment for producing a large size, expandible form or framework for conduits to be utilized at the situs, for example, in tunnels or mines, is shown in part in FIGURE 4. Basically, the unit comprises a lazy tong structure 25 pivoted at the intersection 27 of the individual links 29 which form the lazy tong arrangement. The unit is bent or formed into a circular or other shape by joining adjacent joints 27 along the resultant seam such that forces which tend to pull the unit in a longitudinal direction cause a reduction in the outer dimension of the framework. Individual sections of the lazy tong conduit framework could be coupled together by joining them at their end pivot points. With a reduced outer dimension the unit could be carried within a tunnel and a longitudinal compressive force applied to one end with the other end having been anchored to a previously installed section. The compressive force causes an expansion of the outer dimension of the unit to from a framework of the desired diameter. If desired, latches could be provided to hold the unit at its proper diameter without a maintenance of the compressive force. Once the section is in place, it may be sprayed, for example, with a cementatious material to form a conduit section which is reinforced by the form.

Figure 7:
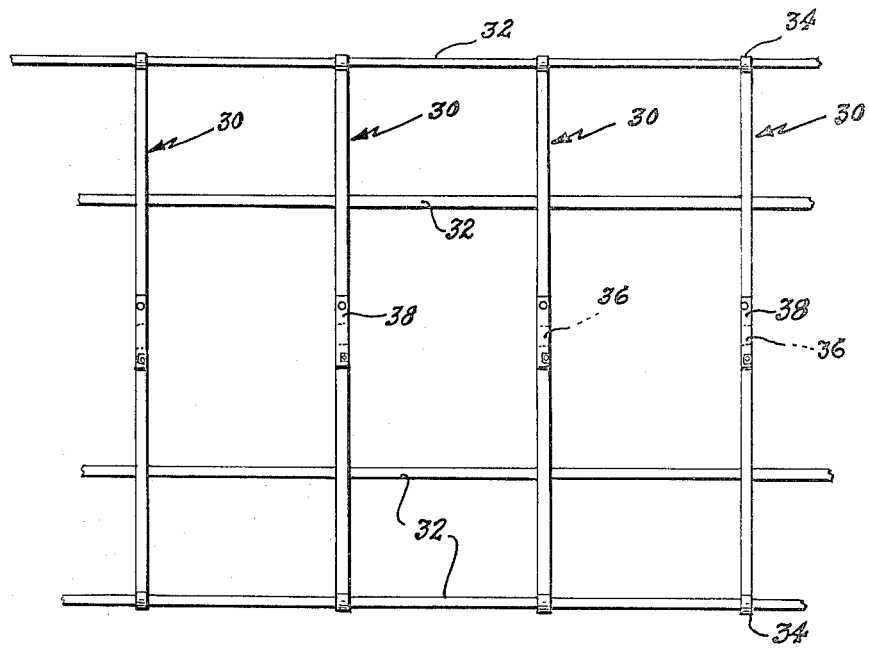
FIGURE 7 is a plan view of the structure of FIGURES 5 and 6 showing rod means for lacing the polygonal frames together.

Another embodiment for a situs constructed pipe or conduit would be a series of polygonal frames 30 composed of link elements (FIGURE 7) which are laced together by means of rigid rod-like elements 32 as shown. FIGURES 5 and 6 show an equilateral polygonal structure which is illustrated as a square; however, it should be understood that various other shapes or forms may be utilized. Pivot points or hinges 34 are provided at the corners and the center 36 of the individual sides. It should be noted that the device could be made octagonal by adjustment of the pivot points, thus it would more nearly approach a circular cross-section. Reduction in the outer dimensions of the unit are caused by a pressing inwardly at the central pivot points 36 such that the device assumes the position shown in phantom lines in FIGURE 5. A further continuation of the collapsing action produces the position of the links to that shown in phantom lines in FIGURE 6, which illustrates the difference in outer dimensions over that of the original polygonal frames 30.

Figure 8:
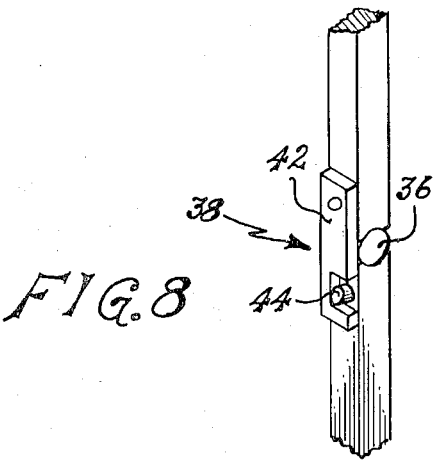
FIGURE 8 is a pictorial representation of one form of latch means capable of being utilized with the form structures illustrated in FIGURES 4–7.

Once the device is in its collapsed form with lacing rods extending through the pivot points, it is inserted within a tunnel or mine conduit to its new position. The rod ends might, if desired, be coupled with the rod ends of the adjacent form sections. The form is then expanded to its desired shape and latches 38 of any conventional type might be utilized to give the structure rigidity. In addition, corner braces 40 might be provided at the apices of the resultant polygonal structure. The corner braces could also be of latch form, one example of which is shown in FIGURE 8. With the unit in place and rendered rigid by the latches and bracing, the device could be sprayed as described relative to FIGURE 4 in order to provide a rigid conduit reinforced by the form.

The latch unit 38, shown in FIGURE 8, comprises a hook shaped element 42 pivoted at one end and adapted to engage either a pin or an eye unit 44 mounted on the opposite side of the pivot to be rigidized.

Figure 9:
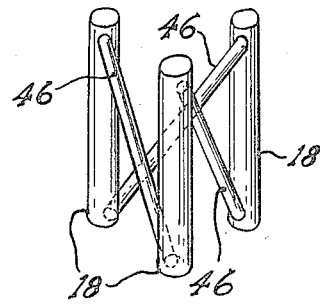
FIGURE 9 is a pictorial representation of an alternate embodiment for the form wherein spring means are provided for the maintenance of the final shape of the form.

The thus far described embodiments utilize either the resiliency of the plastic which forms the body of the pipe or latch means and linkages to give the desired expanded dimensions. In FIGURE 9, there is shown a form which is capable of being either twisted or collapsed when it is covered with a body of plastic material. The form in this instance comprise a series or rigid rods 18 as in the embodiment of FIGURE 1; however, spring members 46 are presented from the top of one rod to the bottom of the adjacent rod, as shown. When the unit is covered with the plastic material formed in the shape of a pipe with flanges thereon, the unit is capable of being deformed or twisted to reduce its outer diameter thereby allowing the unit to be inserted within a previously installed pipe and then expanded by means of the action of springs 46 such that the flange on this unit is engaged with a groove on the previously installed unit. The tool for performing the twisting function would be one with helical lands and grooves such as that shown and described in our copending application Serial No. 306,667, filed on even date herewith.

Thus, there has been described a novel method and apparatus utilized in conduit construction and coupling which allows successively installed sections to be inserted through those first installed.

Although the invention has been described with reference to particular embodiments, it will be understood to those skilled in the art that the invention is capable of a variety of alternative embodiments within the spirit and scope of the appended claims.

We claim:

1. A form for a conduit adapted to be temporarily reduced in cross-section comprising a series of longitudinally oriented lazy tong linkages, said linkages being interconnected and arranged to form an enclosure such that axial extension of the resultant linkage along the conduit axis causes a reduction in the cross-section of said enclosure while a compression expands the cross-section of said enclosure.

2. A conduit adapted to be temporarily reduced in cross-section comprising a form having series of longitudinally oriented lazy tong linkages, said linkages being interconnected and arranged to form an enclosure such that axial extension of the resultant linkage along the conduit axis causes a reduction in the cross-section of said enclosure while a compression expands said form, and a covering encompassing said enclosure.

3. A plastic covered, collapsible conduit comprising, a form having a series of rigid rods oriented parallel to a central axis, resilient spring rod means extending from one end of each of said rigid rods to the other end of one of its adjacent rigid rods, and a pliable plastic material encompassing said form.

4. A conduit form comprising a series of spaced coaxial polygonal frames, each frame being comprised of link elements joined to form an equilateral, polygonal structure, said frames being oriented on a common central axis, rigid rods oriented parallel to said central axis and secured to the link elements of said frames at their points of joinder where they form apices, hinge means secured to each of the intersecting link elements of said frames at said apices, and latch means adjacent said hinges for selectively inhibiting movement of said hinged link elements.

5. A conduit form comprising a series of spaced coaxial polygonal frames, each frame being comprised of link elements joined to form an equilateral, polygonal structure, said frames being oriented on a common central axis, rigid rods oriented parallel to said central axis and secured to the apices at the points of joinder of elements of said frames, hinge means secured to each of the intersecting elements of said frames at said apices, latch means proximate to said hinges for selectively inhibiting movement of the hinged elements, and means encompassing said form.

6. A flexible form for a plastic covered, collapsible conduit comprising a series of parallel oriented rigid rods arranged about a central axis, and resilient spring rod means extending from one end of each of said rigid rods to the other end of one of its adjacent rigid rods.

References Cited by the Examiner

UNITED STATES PATENTS

| | | | |
|---|---|---|---|
| 581,897 | 5/1897 | White | 45—24 |
| 1,115,490 | 11/1914 | Bindley et al. | 50—491 |
| 1,140,448 | 5/1915 | Ellinger | 52—490 |
| 1,400,078 | 12/1921 | Kempton | 138—153 X |
| 2,366,067 | 12/1944 | Smith | 285—306 X |
| 2,567,773 | 9/1951 | Krupp | 285—260 X |
| 2,704,556 | 3/1955 | Blish | 138—138 |
| 3,047,025 | 7/1962 | Davis | 285—260 X |
| 3,092,932 | 6/1963 | Wilson | 52—491 |

FOREIGN PATENTS 620,401   1/1927   France.

SAMUEL ROTHBERG, *Primary Examiner.*

LEWIS J. LENNY, LAVERNE D. GEIGER,
*Examiners.*

T. MOOREHEAD, *Assistant Examiner.*